US008187372B2

(12) United States Patent
Watarai

(10) Patent No.: US 8,187,372 B2
(45) Date of Patent: May 29, 2012

(54) INK-JET O/W EMULSION INK AND INK-JET RECORDING METHOD USING THE SAME

(75) Inventor: Yukitaka Watarai, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 804 days.

(21) Appl. No.: 12/268,686

(22) Filed: Nov. 11, 2008

(65) Prior Publication Data
US 2009/0136669 A1 May 28, 2009

(30) Foreign Application Priority Data

Nov. 13, 2007 (JP) ................................ 2007-294629

(51) Int. Cl.
C09D 11/02 (2006.01)
B05D 5/00 (2006.01)
(52) U.S. Cl. ............... 106/31.25; 106/31.67; 106/31.86; 427/256
(58) Field of Classification Search ............... 106/31.25, 106/31.86, 31.67; 427/256
See application file for complete search history.

(56) References Cited

U.S. PATENT DOCUMENTS

| 5,358,555 | A | * | 10/1994 | Argentero et al. | ......... | 106/31.25 |
| 6,063,835 | A | * | 5/2000 | Ohshima et al. | ............ | 523/161 |
| 2006/0100309 | A1 | | 5/2006 | Adams et al. | ............ | 106/31.26 |
| 2008/0241389 | A1 | * | 10/2008 | Mullay et al. | ............ | 427/256 |
| 2008/0248260 | A1 | * | 10/2008 | Kojima et al. | ............ | 428/195.1 |

FOREIGN PATENT DOCUMENTS

| EP | 0 564 147 A1 | 10/1993 |
| EP | 0 839 881 A2 | 5/1998 |
| EP | 0928821 A1 * | 7/1999 |
| JP | 6-220376 | 8/1994 |
| JP | 9-227812 | 9/1997 |
| JP | 10-1629 | 1/1998 |
| JP | 11-263931 | 9/1999 |
| JP | 2002-256195 | 9/2002 |
| JP | 2006-282986 | 10/2006 |
| JP | 2006-321876 | 11/2006 |
| KR | 10-2004-0103579 | 12/2004 |
| WO | 2005/113694 A1 | 12/2005 |

* cited by examiner

Primary Examiner — Helene Klemanski
(74) Attorney, Agent, or Firm — Oblon, Spivak, McClelland, Maier & Neustadt, L.L.P.

(57) ABSTRACT

An ink-jet O/W emulsion ink of the present invention includes an aqueous continuous phase (a), and a nonaqueous discontinuous phase (b), wherein the aqueous continuous phase (a) includes water, at least one pigment and at least one ionic or nonionic surfactant, and the nonaqueous discontinuous phase (b) includes at least one water-insoluble organic material having a hydroxyl group.

14 Claims, 3 Drawing Sheets

INK-JET O/W EMULSION INK AND INK-JET RECORDING METHOD USING THE SAME

BACKGROUND OF THE INVENTION

1. Field of the Invention

The present invention relates to an ink-jet O/W emulsion ink, and an ink-jet recording method using the same.

2. Description of the Related Art

Conventionally, techniques for printing images, letters/characters, etc. onto recording paper by ink-jet method have been proposed.

Aqueous ink-jet inks have the merit of causing less bleeding and less strike-through, yielding high image densities, and so forth when printing is carried out using plain paper.

However, in the case where the aqueous ink-jet inks are attached onto recording paper in large amounts so as to print photographs, charts, etc. thereon, there is such a problem that the recording paper easily curls. When the recording paper curls, paper conveyance in ink-jet printers becomes troublesome; paper conveyance may possibly become difficult, especially at the time of high-speed printing or double-sided printing.

Because of the above-mentioned problem, a formulation of ink capable of reducing the occurrence of paper curling related to the amount of ink attached is hoped for.

As to high-speed ink-jet printers with line heads, in particular, there is a much greater need for the formulation of ink than in the case of serial printers. To reduce curling of recording paper, the following methods have been proposed, for example: a method of adding into an ink a copolymer of acrylic acid and vinylpyrrolidone having a molecular weight of approximately 80,000 to 250,000 (refer, for example, to Japanese Patent Application Laid-Open (JP-A) No. 10-1629); a method of adding into an ink a pigment and colloidal silica having an average particle diameter of 5 nm to 100 nm (refer, for example, to JP-A No. 09-227812); and a method of adding into an ink a water-soluble organic solvent whose solubility parameter is greater than or equal to 8 and less than 12 and a metal oxide colloid (refer, for example, to JP-A No. 2006-321876).

However, any of those conventionally proposed methods for reducing curling of recording paper is a method of reducing absorption of moisture in the ink into the recording paper, namely cellulose fiber, by adding a certain solid content into the ink. To reduce curling of the recording paper, it is necessary to maintain hydrogen bonds which act between cellulose molecules constituting the cellulose fiber; mere addition of a solid content into the ink allows an ink solvent (based upon alcohol, water, etc.) to permeate between the cellulose molecules, thereby causing the cellulose fiber to swell, and so cannot reduce the occurrence of curling of the recording paper.

Also, when an attempt is made to sufficiently reduce permeation of the ink solvent (based upon alcohol, water, etc.) between the cellulose molecules by adding a large amount of solid content into the ink, there is such a problem that the continuous ejection stability of the ink from an ink-jet head degrades, and the ejection stability of the ink from the ink-jet head degrades after left unused.

BRIEF SUMMARY OF THE INVENTION

The present invention examines a composition of an ink-jet O/W emulsion ink having an aqueous continuous phase and a nonaqueous discontinuous phase and is aimed at reducing the occurrence of curling of recording paper by reducing permeation of an ink solvent (based upon alcohol, water, etc.) between cellulose molecules of the recording paper, without impairing the ink's favorable continuous ejection stability from an ink-jet head and the ink's favorable ejection stability from the ink-jet head after left unused.

Means for Solving the Problems are as Follows

<1> An ink-jet O/W emulsion ink including an aqueous continuous phase (a), and a nonaqueous discontinuous phase (b), wherein the aqueous continuous phase (a) includes water, at least one pigment and at least one ionic or nonionic surfactant, and the nonaqueous discontinuous phase (b) includes at least one water-insoluble organic material having a hydroxyl group.

<2> The ink-jet O/W emulsion ink according to <1>, wherein the nonaqueous discontinuous phase (b) occupies 1% by mass to 74% by mass of the ink-jet O/W emulsion ink.

<3> The ink-jet O/W emulsion ink according to <1>, wherein the at least one water-insoluble organic material having a hydroxyl group, contained in the nonaqueous discontinuous phase (b), is a hydroxy fatty acid ester of a polyhydric alcohol.

<4> The ink-jet O/W emulsion ink according to <1>, wherein the aqueous continuous phase (a) contains a nonvolatile water-soluble organic solvent.

<5> An ink-jet recording method including performing recording by ejecting an ink from an ink-jet head fixed in the form of a line, wherein the ink is the ink-jet O/W emulsion ink according to any one of <1> to <4>.

The ink-jet O/W emulsion ink of the present invention has made it possible to effectively reduce the occurrence of curling of recording paper and also to practically maintain the ink's favorable continuous ejection stability and the ink's favorable ejection stability after left unused.

Specifically, due to the structure in which a nonaqueous discontinuous phase that contains at least one water-insoluble organic material having a hydroxyl group is dispersed and emulsified in an aqueous continuous phase, the at least one water-insoluble organic material having a hydroxyl group, which is a discontinuous phase component, permeates between cellulose molecules, with a water-insoluble component covering hydrogen bonds that lie between the cellulose molecules, and thus permeation of the aqueous continuous phase (based upon alcohol, water, etc.) can be reduced. More specifically, this is possible because the water-insoluble organic material has fewer hydrogen bond portions, as is evident from its insolubility in water, and thus the water-insoluble organic material has lower surface tension and tends to permeate between the cellulose molecules sooner. Additionally, this is possible also because the hydroxyl group of the water-insoluble organic material undergoes hydrogen bonding with a hydroxyl group of a cellulose molecule and remains in the cellulose molecule portion, and the water-insoluble component of the water-insoluble organic material covers the hydrogen bond of the cellulose molecule, thereby preventing contact between the hydrogen bond and the aqueous continuous phase (based upon alcohol, water, etc.).

Furthermore, what covers the hydrogen bond of the cellulose molecule and thusly prevents contact between the hydrogen bond and the aqueous continuous phase (based upon alcohol, water, etc.) is the discontinuous phase of the O/W emulsion, in other words, a liquid; therefore, even if the aqueous continuous phase volatilizes, precipitation of a solid content, solidification and reduction in fluidity do not easily arise, and so the ink's continuous ejection stability and the ink's ejection stability after left unused are favorable.

DETAILED DESCRIPTION OF THE INVENTION

The following specifically explains an ink-jet O/W emulsion ink of the present invention, and a recording method using the same. It should, however, be noted that the present invention is not confined to the following explanations.

The O/W emulsion ink of the present invention has the following structures (a) and (b).

The symbol (a) denotes an aqueous continuous phase which contains water, at least one pigment and at least one ionic or nonionic surfactant, and the symbol (b) denotes a nonaqueous discontinuous phase which contains at least one water-insoluble organic material having a hydroxyl group.

Figure 1:
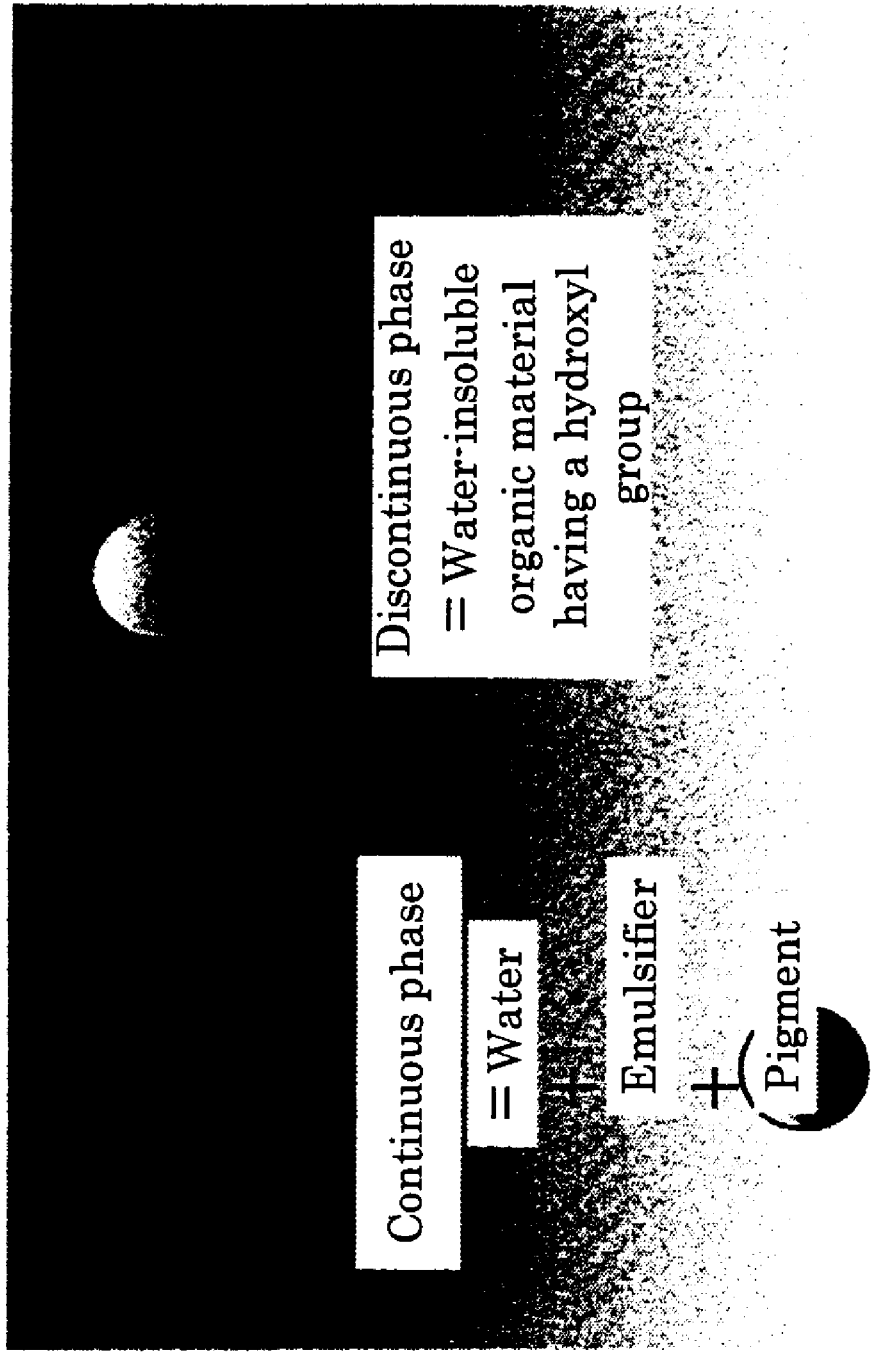
FIG. 1 is a structural model diagram of an ink-jet O/W emulsion ink of the present invention.

A structural model diagram of the ink-jet O/W emulsion ink of the present invention is shown in FIG. 1.

The following explains components of the ink-jet O/W emulsion ink in detail.

Here, the pigment contained in the above-mentioned aqueous continuous phase (a) is explained.

Examples of the pigment that can be suitably used for the O/W emulsion ink of the present invention include organic pigments and inorganic pigments.

Those suitable for black-and-white printing include carbon blacks (C. I. Pigment Black 7) such as furnace black, lamp black, acetylene black and channel black; metals such as copper, iron (C. I. Pigment Black 11) and titanium oxide; and organic pigments such as aniline black (C. I. Pigment Black 1).

Those suitable for color printing include C. I. Pigment Yellow 1 (Fast Yellow G), 3, 12 (Disazo Yellow AAA), 13, 14, 17, 24, 34, 35, 37, 42 (yellow iron oxide), 53, 55, 81, 83 (Disazo Yellow HR), 95, 97, 98, 100, 101, 104, 108, 109, 110, 117, 120, 138 and 153; C. I. Pigment Orange 5, 13, 16, 17, 36, 43 and 51; C. I. Pigment Red 1, 2, 3, 5, 17, 22 (Brilliant Fast Scarlet), 23, 31, 38, 48:2 (Permanent Red B(Ba)), 48:2 (Permanent Red 2B(Ca)), 48:3 (Permanent Red 2B(Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G Lake), 83, 88, 101 (red ochre), 104, 105, 106, 108 (cadmium red), 112, 114, 122 (quinacridone magenta), 123, 146, 149, 166, 168, 170, 172, 177, 178, 179, 185, 190, 193, 209 and 219; C. I. Pigment Violet 1 (rhodamine lake), 3, 5:1, 16, 19 (quinacridone red), 23 and 38; C. I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:127 (Prussian blue), 28 (cobalt blue), 29 (ultramarine), 56, 60 and 63; and C. I. Pigment Green 1, 4, 7, 8, 10, 17, 18 and 36.

Next, the surfactant contained in the above-mentioned aqueous continuous phase (a) will be explained.

In the present invention, an ionic surfactant or a nonionic surfactant is used as the surfactant.

To secure sufficient wettability, the amount of the surfactant added is kept in the range of 0.01% by mass to 10% by mass, preferably in the range of 0.1% by mass to 8% by mass.

Examples of anionic surfactants among ionic surfactants include, but are not limited to, higher fatty acid salts, higher alkyldicarboxylic acid salts, higher alcohol sulfuric acid ester salts, higher alkylsulfonic acid salts, alkylbenzenesulfonic acid salts, alkylnaphthalenesulfonic acid salts, formalin polycondensates of salts (Na, K, Li and Ca) of naphthalenesulfonic acid, condensates of higher fatty acids and amino acids, dialkylsulfosuccinic acid ester salts, alkylsulfosuccinic acid salts, naphthenic acid salts, alkyl ether carboxylates, acylated peptides, α-olefin sulfonates, N-acylmethyltaurines, alkyl ether sulfates, secondary higher alcohol ethoxy sulfates, polyoxyethylene alkylphenyl ether sulfates, monoglysulfates, alkyl ether phosphoric acid ester salts and alkyl phosphoric acid ester salts.

Examples of cationic surfactants among ionic surfactants include, but are not limited to, aliphatic amine salts, quaternary ammonium salts, sulfonium salts and phosphonium salts.

Examples of nonionic surfactants include, but are not limited to, fluorine-based surfactants, silicone-based surfactants, acrylic acid copolymer materials, polyoxyethylene alkyl ethers, polyoxyethylene alkylphenyl ethers, polyoxyethylene secondary alcohol ethers, polyoxyethylene sterol ethers, polyoxyethylene lanolin derivatives, ethylene oxide derivatives of alkylphenol formalin condensates, polyoxyethylene-polyoxypropylene block polymers, fatty acid esters of polyoxyethylene polyoxypropylene alkyl ether polyoxyethylene compounds, polyethylene oxide condensed polyethylene glycol fatty acid esters, fatty acid monoglycerides, polyglycerin fatty acid esters, sorbitan fatty acid esters, propylene glycol fatty acid esters, sucrose fatty acid esters, fatty acid alkanol amides, polyoxyethylene fatty acid amides and polyoxyethylene alkylamine alkylamine oxides.

Among these compounds, particular preference is given to sodium dioctyl sulfosuccinate (higher alkylsulfonic acid salts) and polyoxyethylene sorbitan monolaurate (sorbitan fatty acid esters).

Here, the water-insoluble organic material having a hydroxyl group, contained in the above-mentioned nonaqueous discontinuous phase (b), is explained.

For this water-insoluble organic material, an emulsifier normally utilized for the purpose of forming a water-in-oil emulsion is used, and particular preference is given to nonionic surfactants.

Specific examples thereof include sorbitan fatty acid esters such as sorbitan monooleate, sorbitan sesquioleate, sorbitan trioleate and sorbitan monostearate; polyoxyethylene sorbitan fatty acid esters such as polyoxyethylene sorbitan monooleate and polyoxyethylene sorbitan trioleate; (poly) glycerin fatty acid esters such as glyceryl monostearate, decaglyceryl trioleate and hexaglycerin polyricinolate; polyoxyethylene glycerin fatty acid esters such as polyoxyethylene sorbitol fatty acid esters and polyoxyethylene glycerin vegetable oil fatty acid esters; polyethylene glycol fatty acid esters, polyoxyethylene alkyl ethers, polyoxyethylene alkylphenyl ethers, polyoxyethylene alkylamine-fatty acid amides, polyoxyethylene polyoxypropylene alkyl ethers, polyoxyethylene castor oil, polyoxyethylene hardened castor oil and higher alcohols.

Each of these may be used alone or in combination with two or more.

Among these compounds, particular preference is given to hexaglycerin polyricinolate (polyhydric alcohol hydroxy fatty acid esters).

The nonaqueous discontinuous phase (b) preferably occupies 1% by mass to 74% by mass of the O/W emulsion ink. The upper limit of 74% by mass is the amount when the O/W emulsion ink is most closely packed with the nonaqueous discontinuous phase (b); if the amount of the nonaqueous discontinuous phase (b) is larger than this, the stability of the emulsion may degrade, and thus the continuous ejection stability of the ink may degrade as well. Conversely, if the nonaqueous discontinuous phase (b) occupies less than the lower limit of 1% by mass, adequate curl-reducing effect may not be obtained.

It is desirable that the aqueous continuous phase (a) contain a nonvolatile water-soluble organic solvent.

This water-soluble organic solvent functions as an evaporation preventing agent or a freezing preventing agent.

Specific examples thereof include glycols such as ethylene glycol, diethylene glycol and propylene glycol; lower saturated monovalent alcohols such as methanol, ethanol, isopropanol, butanol and isobutanol; and polyhydric alcohols such as 1,3-butanediol, glycerin and sorbitol.

Each of these may be used alone or in combination with two or more.

The amount of the water-soluble organic solvent added into the ink of the present invention is preferably 40% by mass or less, more preferably 15% by mass to 35% by mass.

Next, resins used in the ink of the present invention will be explained.

To the aqueous continuous phase (a), a water-soluble polymeric compound may be added.

This water-soluble polymeric compound is not particularly limited and may be suitably selected from known materials. Examples thereof include natural polymeric compounds, semisynthetic polymeric compounds and synthetic polymeric compounds.

Examples of the natural polymeric compounds include starch, mannan, sodium alginate, galactan, tragacanth gum, gum arabic, pullulan, dextran, xanthan gum, glue, gelatin, collagen and casein.

Examples of the semisynthetic polymeric compounds include carboxymethyl cellulose, methyl cellulose, hydroxyethyl cellulose, hydroxypropyl cellulose, hydroxypropylmethyl cellulose, hydroxymethyl starch, carboxymethyl starch and dialdehyde starch.

Examples of the synthetic polymeric compounds include acrylic acid resin derivatives such as polyvinylpyrrolidone, polyacrylic acid, sodium polyacrylate and triethanolamine polyacrylate; and synthetic polymeric compounds such as polyvinyl alcohol, polyacrylamide, polyethylene oxide and polyvinyl methyl ethers.

Each of the water-soluble polymeric compounds may be used alone or in combination with two or more.

The amount of the water-soluble polymeric compound(s) added is preferably 10% by mass or less, more preferably 0.5% by mass to 5% by mass.

An O/W resin emulsion may be contained in the aqueous continuous phase (a).

The material for the resin is not particularly limited and may be suitably selected from conventionally known materials.

Examples thereof include polyvinyl acetate resins, acrylic acid ester resins, methacrylic acid ester resins, polyvinyl chloride resins, ethylene-vinyl acetate copolymers, vinyl acetate-acrylic acid ester copolymers, styrene-acrylic acid ester copolymers, vinylidene chloride-acrylic acid ester copolymers, vinyl chloride-vinyl acetate copolymers and urethane resins.

Each of these may be used alone or in combination with two or more.

To the nonaqueous discontinuous phase (b), an oil-soluble polymeric compound may be added.

Examples of the oil-soluble polymeric compound include polymeric compounds commonly used in oil-based inks.

Examples thereof include rosin resins such as rosin, polymerized rosin, hydrogenated rosin, rosin esters, rosin polyester resins and hydrogenated rosin esters; rosin-modified resins such as rosin-modified alkyd resins, rosin-modified maleic acid resins and rosin-modified phenol resins; maleic acid resins, phenol resins, petroleum resins, rubber derivative resins such as cyclized rubbers, terpene resins, alkyd resins, and polymerized castor oil. Each of these may be used alone or in combination with two or more.

Next, the effect of reducing curling of recording paper when printing is carried out using the emulsion ink of the present invention will be explained with reference to FIG. 2.

Figure 2:
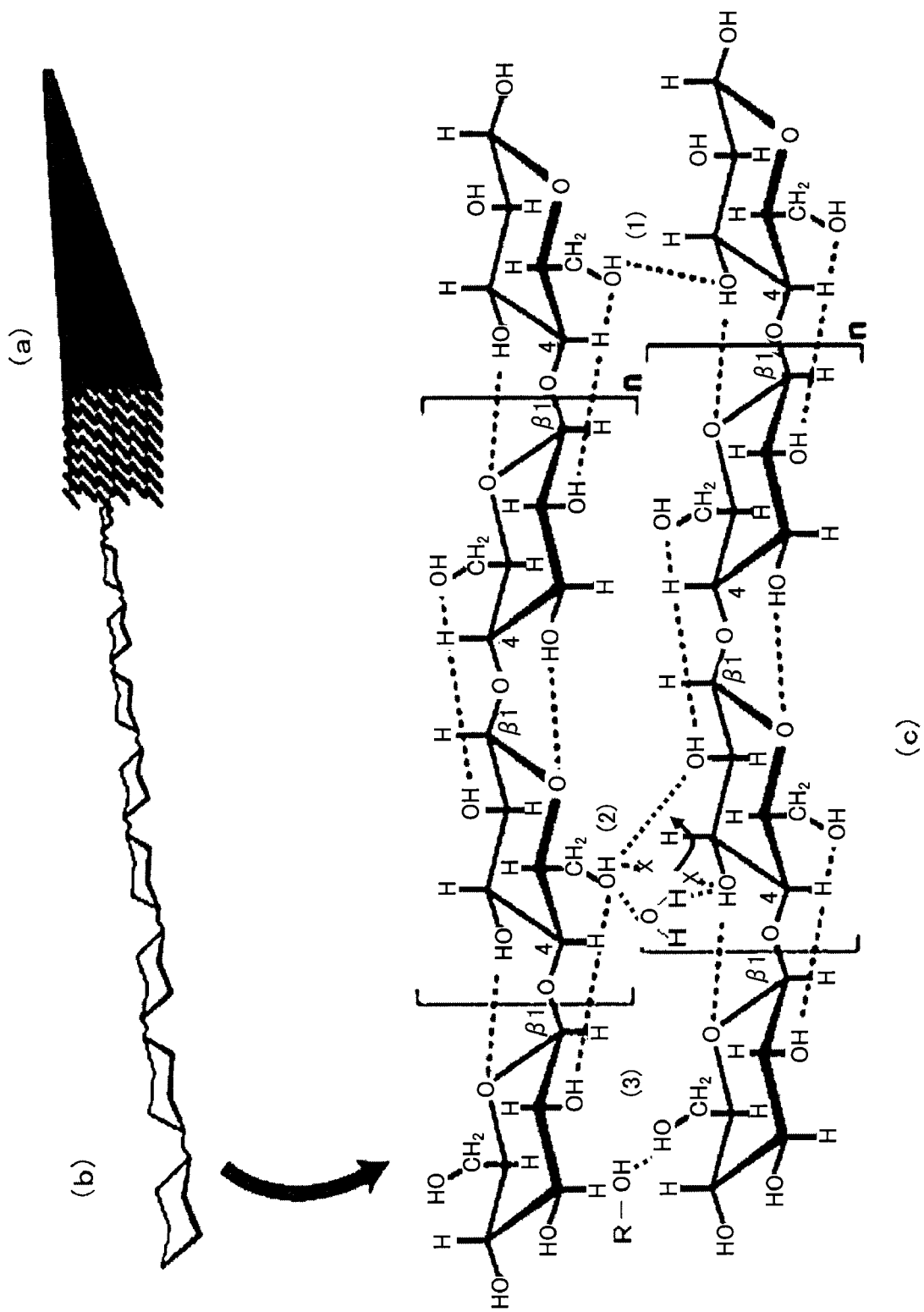
FIG. 2 is a model diagram composed of parts (a), (b) and (c), showing how the occurrence of curling of recording paper is prevented.

As shown by (a) in FIG. 2, a plant fiber, a component of recording paper, is formed of a threadlike structure called "fibril", the fibril is composed of microfibrils each having a diameter of several nanometers to 20 nm and a length of 1 µm to several micrometers, and each microfibril is composed of several to several tens of elementary fibrils.

As shown by (b) in FIG. 2, an elementary fibril is composed of several tens of cellulose molecules that are aligned in parallel. Here, strong hydrogen bonds are formed between adjacent cellulose molecules, and a bundle having a diameter of 3 nm to 4 nm is thus formed.

A difference between the manner in which water acts between cellulose molecules and the manner in which a water-insoluble organic material having a hydroxyl group acts between the cellulose molecules is shown by (c) in FIG. 2.

The formula shown by (c) in FIG. 2 represents the structure of two cellulose molecules. Hydrogen bonds are formed between the molecules.

Hydrogen bond (1) represents a normal state of hydrogen bonding between the cellulose molecules.

Hydrogen bond (2) represents a state in which a water molecule is present in a hydrogen bond between the cellulose molecules, and the position of the hydrogen bond has changed as a result of evaporation of the water. More specifically, the water infiltrates into the paper, and thus the hydrogen bond between the cellulose molecules is broken as shown in the figure. This causes the fiber to slacken and elongate. Here, when the water disappears from its position as it dries up or moves, the fiber contracts and the broken hydrogen bond re-forms. However, such pressure that is applied at the time of papermaking is not applied to the paper on this occasion; thus, in the drying process, the fiber is subjected to hydrogen bonding in positions where the fiber is slack, which causes the paper to have a different form. In other words, the recording paper is caused to curl.

Hydrogen bond (3) represents a state in which a water-insoluble organic material having a hydroxyl group is present with a hydroxyl group that is not involved in a hydrogen bond between the cellulose molecules, and infiltration of a water molecule between the cellulose molecules is thereby prevented.

In FIG. 2, each broken line represents a hydrogen bond, and R denotes an alkyl group.

Next, a recording method using the above-mentioned emulsion ink of the present invention will be explained.

Figure 3:
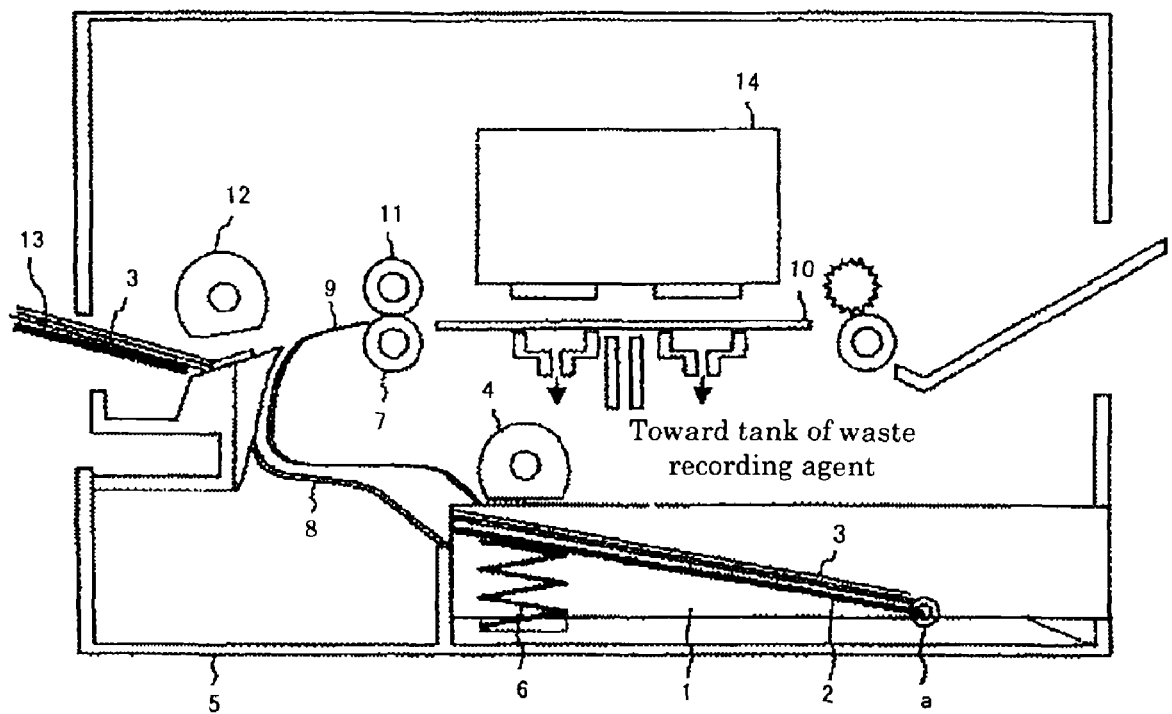
FIG. 3 is a schematic structural diagram of an ink-jet recording apparatus.

A schematic structural diagram of one example of a line head printing apparatus is shown in FIG. 3.

As to a paper feed tray 1 in this printing apparatus, a pressure plate 2, and a paper feed rotating member 4 for feeding recording paper 3 are mounted on a base 5.

The pressure plate 2 can rotate on a rotating shaft "a" which is mounted on the base 5, and the pressure plate 2 is biased toward the paper feed rotating member 4 by a plate-pressing spring 6.

A site of the pressure plate 2, which faces this paper feed rotating member 4, is provided with a separation pad (not shown) made of a material having a large friction coefficient, such as artificial leather, in order to avoid sending a plurality of sheets of the recording paper 3 at a time.

Additionally, a release cam (not shown) for releasing the contact between the pressure plate 2 and the paper feed rotating member 4 is provided.

As to the printing apparatus with the above-mentioned structure, first of all, in its standby state, the release cam pushes the pressure plate 2 down to a predetermined position. Thus, the contact between the pressure plate 2 and the paper feed rotating member 4 is released. In this state, when driving force from a conveyance roller 7 is transmitted to the paper feed rotating member 4 and the release cam by means of a gear or the like, the pressure plate 2 rises as the release cam detaches from the pressure plate 2, and the paper feed rotating member 4 and the recording paper 3 are brought into contact with each other.

As the paper feed rotating member 4 rotates, sheets of the recording paper 3 are picked up so as to be fed, and these sheets are separated from one another by a certain separation pawl (not shown).

The paper feed rotating member 4 rotates so as to send the recording paper 3 to a platen 10 via conveyance guides 8 and 9.

The recording paper 3 passes between the conveyance guides 8 and 9 and is led to the conveyance roller 7, then it is conveyed to the platen 10 by the conveyance roller 7 and a pinch roller 11.

Thereafter, the printing apparatus comes into a standby state again where the contact between the recording paper 3 and the paper feed rotating member 4 is released; thus, the driving force from the conveyance roller 7 stops being transmitted.

A paper feed rotating member 12 for manual paper feeding has a function of feeding the recording paper 3 installed on a manual bypass tray 13 and conveying it to the conveyance roller 7 in accordance with a recording command signal from a computer.

The recording paper 3 conveyed to the platen 10 passes under a line head 14. Here, the speed at which the recording paper is conveyed and the timing of droplet ejection are determined based upon a signal controlled by a certain electrical circuit (not shown), and a desired image is thereby formed.

EXAMPLES

As described below, the ink-jet emulsion ink of the present invention was inspected by producing specific samples of Examples and Comparative Examples. It should be noted that the present invention is not confined to the following Examples.

Comparative Examples 1 and 2

For Comparative Examples 1 and 2, aqueous inks were produced.

A pigment dispersion solution for Comparative Example 1 was produced by adding a solvent and a pigment to water, and dispersing the ingredients with agitation using a dissolver (DISPERMAT-FE), and a pigment dispersion solution for Comparative Example 2 was produced in the same manner except that an O/W resin emulsion was also added to water. These pigment dispersion solutions were filtered with a filter of 3 μm in average pore diameter, and aqueous ink-jet inks were thus obtained.

Examples 1 to 7 and Comparative Examples 3 and 4

For Examples 1 to 7 and Comparative Examples 3 and 4, O/W inks were produced.

Pigment dispersions were each produced by adding a pigment dispersant and a pigment to a water-insoluble organic material that was to serve as a nonaqueous discontinuous phase, and milling the mixture with the use of a three-roll mill (S-4-¾×11, manufactured by INOUE MFG., INC.). The water-insoluble organic material was additionally mixed into each of these pigment dispersions and dispersed with agitation using a dissolver (DISPERMAT-FE) so as to form oil phases. These oil phases were added to water phases each containing water, a water-soluble organic solvent, a resin, a pigment and an emulsifier and emulsified using a vacuum emulsifying stirrer (PVQ-3UN, manufactured by MIZUHO Industrial CO. LTD.), then the mixtures were filtered with a filter of 3 μm in average pore diameter, and ink-jet O/W (oil-in-water) emulsion inks were thus obtained.

<Evaluation of Continuous Ejection Stability>

The inks of Examples 1 to 7 and Comparative Examples 1 to 4 produced as described above were evaluated for their continuous ejection stability from a head, using a line head printing apparatus.

Printer: experimental line head printing apparatus

Recording paper: TYPE 6200 PPC Paper, produced by Ricoh Company, Ltd.

Printing condition: 23° C./65%

Printing was carried out on 1,000 sheets of the recording paper under the above-mentioned printing condition, then the dot diameter variation (%) was evaluated in five grades.

The evaluation criteria were as follows: when it was less than 5%, the grade was 5; when it was greater than or equal to 5% and less than 10%, the grade was 4; when it was greater than or equal to 10% and less than 15%, the grade was 3; when it was greater than or equal to 15% and less than 20%, the grade was 2; and when it was 20% or greater, the grade was 1.

<Method of Evaluating Curl Amount of Recording Paper>

Printing was carried out on sheets of recording paper, using the inks of Examples 1 to 7 and Comparative Examples 1 to 4 produced as described above, and the curl amount of each sheet of the recording paper was evaluated.

Printer: experimental line head printing apparatus

Recording paper: TYPE 6200 PPC Paper, produced by Ricoh Company, Ltd.

Printing condition: 23° C./65%

A solid image was printed onto one side of each sheet of the recording paper under the above-mentioned printing condition, then the solid image was dried as the recording paper was placed flat for 30 minutes with the printed surface facing upward, and the amount by which an end of each sheet had curled was evaluated in five grades.

The evaluation criteria were as follows: when the amount was less than 3 mm, the grade was 5; when the amount was greater than or equal to 3 mm and less than 6 mm, the grade was 4; when the amount was greater than or equal to 6 mm and less than 9 mm, the grade was 3; when the amount was greater than or equal to 9 mm and less than 12 mm, the grade was 2; and when the amount was 12 mm or greater, the grade was 1.

The formulations of the inks and the evaluation results of the continuous ejection stability and of the curl amounts concerning Examples 1 to 7 and Comparative Examples 1 to 4 are shown in Tables 1 to 6 below.

In Tables below, "1,3-BD" denotes 1,3-butanediol; "c", "m", "y" and "k" denote cyan, magenta, yellow and black respectively; "PB15:3" denotes C. I. Pigment Blue 15:3 (phthalocyanine blue); "DQ122" denotes C. I. Pigment Red 122 (dimethylquinacridone); "MA74" denotes C. I. Pigment Yellow 74 (monoazo); "Acid CB" denotes acid carbon black; "DO-S" denotes sodium dioctylsulfosuccinate; "EO-SML" denotes polyoxyethylene sorbitan monolaurate; "n-PO" denotes paraffin oil; "NO" denotes naphthenic oil; "STO" denotes sorbitan trioleate; and "HGPR" denotes hexaglycerin polyricinolate (polyhydric alcohol hydroxy fatty acid ester).

For the resin emulsion shown in Tables below, fine resin particles (SX1105A: styrene-butadiene copolymer resin, 0.109 μm in average particle diameter, produced by ZEON CORPORATION) were used.

For the various self-dispersible pigments also shown in Tables below, the following materials were used respectively.

Self-dispersible pigment (CAB-O-JET250: PB15:4, 0.091 μm in average particle diameter, produced by Cabot Corporation)

Self-dispersible pigment (CAB-O-JET260: PR122, 0.105 μm in average particle diameter, produced by Cabot Corporation)

Self-dispersible pigment (CAB-O-JET270: Py74, 0.137 μm in average particle diameter, produced by Cabot Corporation)

Self-dispersible pigment (CAB-O-JET300: Carbon Black, 0.130 μm in average particle diameter, produced by Cabot Corporation)

The formulations of the inks and the evaluation results of the continuous ejection stability and of the curl amounts concerning Comparative Examples 1 and 2 are shown in Table 1 below.

TABLE 1

|  |  |  |  | Comparative Example 1 (without discontinuous phase) | | | | Comparative Example 2 (without discontinuous phase, and with resin) | | | |
|---|---|---|---|---|---|---|---|---|---|---|---|
|  |  |  |  | Cyan | Magenta | Yellow | Black | Cyan | Magenta | Yellow | Black |
| Formulation | Aqueous continuous phase | Water | Ion-exchange water | 60.00 | 60.00 | 60.00 | 60.00 | 58.72 | 58.72 | 58.72 | 58.72 |
|  |  | Water-soluble organic solvent | Glycerin | 17.00 | 17.00 | 17.00 | 17.00 | 16.63 | 16.63 | 16.63 | 16.63 |
|  |  |  | 1,3-BD | 17.00 | 17.00 | 17.00 | 17.00 | 16.64 | 16.64 | 16.64 | 16.64 |
|  |  |  | 2-pyrrolidone | 1.00 | 1.00 | 1.00 | 1.00 | 1.00 | 1.00 | 1.00 | 1.00 |
|  |  | Resin | Resin emulsion |  |  |  |  | 2.00 | 2.00 | 2.00 | 2.00 |
|  |  | Pigment (self-dispersible) | c PB15:4 | 5.00 |  |  |  | 5.00 |  |  |  |
|  |  |  | m DQ122 |  | 5.00 |  |  |  | 5.00 |  |  |
|  |  |  | y MA74 |  |  | 5.00 |  |  |  | 5.00 |  |
|  |  |  | k Acid CB |  |  |  | 5.00 |  |  |  | 5.00 |
|  | Emulsifier |  | DO-S |  |  |  |  |  |  |  |  |
|  |  |  | EO-SML |  |  |  |  |  |  |  |  |
|  | Nonaqueous discontinuous phase | Water-insoluble organic material having no hydroxyl group | n-PO |  |  |  |  |  |  |  |  |
|  |  |  | NO |  |  |  |  |  |  |  |  |
|  |  | Water-insoluble organic material having a hydroxyl group | STO |  |  |  |  |  |  |  |  |
|  |  |  | HGPR |  |  |  |  |  |  |  |  |
|  | Total (Ink % by mass) |  |  | 100.00 | 100.00 | 100.00 | 100.00 | 100.00 | 100.00 | 100.00 | 100.00 |
|  | Continuous ejection stability |  |  | 5 | 5 | 5 | 5 | 1 | 1 | 1 | 1 |
|  | Curl amount |  |  | 1 | 1 | 1 | 1 | 2 | 2 | 2 | 2 |

The formulations of the inks and the evaluation results of the continuous ejection stability and of the curl amounts concerning Comparative Examples 3 and 4 are shown in Table 2 below.

TABLE 2

|  |  |  |  | Comparative Example 3 (discontinuous phase: 16%, n-PO discontinuous phase) | | | | Comparative Example 4 (discontinuous phase: 16%, NO discontinuous phase) | | | |
|---|---|---|---|---|---|---|---|---|---|---|---|
|  |  |  |  | Cyan | Magenta | Yellow | Black | Cyan | Magenta | Yellow | Black |
| Formulation | Aqueous continuous phase | Water | Ion-exchange water | 48.51 | 48.51 | 48.51 | 48.51 | 48.51 | 48.51 | 48.51 | 48.51 |
|  |  | Water-soluble organic solvent | Glycerin | 13.74 | 13.74 | 13.74 | 13.74 | 13.74 | 13.74 | 13.74 | 13.74 |
|  |  |  | 1,3-BD | 13.75 | 13.75 | 13.75 | 13.75 | 13.75 | 13.75 | 13.75 | 13.75 |
|  |  |  | 2-pyrrolidone | 1.00 | 1.00 | 1.00 | 1.00 | 1.00 | 1.00 | 1.00 | 1.00 |
|  |  | Resin | Resin emulsion |  |  |  |  |  |  |  |  |
|  |  | Pigment (self-dispersible) | c PB15:4 | 5.00 |  |  |  | 5.00 |  |  |  |
|  |  |  | m DQ122 |  | 5.00 |  |  |  | 5.00 |  |  |

TABLE 2-continued

|  |  |  | Comparative Example 3 (discontinuous phase: 16%, n-PO discontinuous phase) | | | | Comparative Example 4 (discontinuous phase: 16%, NO discontinuous phase) | | | |
| --- | --- | --- | --- | --- | --- | --- | --- | --- | --- | --- |
|  |  |  | Cyan | Magenta | Yellow | Black | Cyan | Magenta | Yellow | Black |
|  |  | y MA74 |  |  | 5.00 |  |  |  | 5.00 |  |
|  |  | k Acid CB |  |  |  | 5.00 |  |  |  | 5.00 |
| Emulsifier |  | DO-S EO-SML | 2.00 | 2.00 | 2.00 | 2.00 | 2.00 | 2.00 | 2.00 | 2.00 |
| Nonaqueous discontinuous phase | Water-insoluble organic material having no hydroxyl group | n-PO NO | 16.00 | 16.00 | 16.00 | 16.00 | 16.00 | 16.00 | 16.00 | 16.00 |
|  | Water-insoluble organic material having a hydroxyl group | STO HGPR |  |  |  |  |  |  |  |  |
| Total (Ink % by mass) |  |  | 100.00 | 100.00 | 100.00 | 100.00 | 100.00 | 100.00 | 100.00 | 100.00 |
| Continuous ejection stability |  |  | 5 | 5 | 5 | 5 | 4 | 4 | 4 | 4 |
| Curl amount |  |  | 2 | 2 | 2 | 2 | 2 | 2 | 2 | 2 |

The formulations of the inks and the evaluation results of the continuous ejection stability and of the curl amounts concerning Examples 1 and 2 are shown in Table 3 below.

TABLE 3

|  |  |  |  | Example 1 (discontinuous phase: 16%, STO discontinuous phase) | | | | Example 2 (discontinuous phase: 16%, HGPR discontinuous phase) | | | |
| --- | --- | --- | --- | --- | --- | --- | --- | --- | --- | --- | --- |
|  |  |  |  | Cyan | Magenta | Yellow | Black | Cyan | Magenta | Yellow | Black |
| Formulation | Aqueous continuous phase | Water | Ion-exchange water | 48.51 | 48.51 | 48.51 | 48.51 | 48.51 | 48.51 | 48.51 | 48.51 |
|  |  | Water-soluble organic solvent | Glycerin | 13.74 | 13.74 | 13.74 | 13.74 | 13.74 | 13.74 | 13.74 | 13.74 |
|  |  |  | 1,3-BD | 13.75 | 13.75 | 13.75 | 13.75 | 13.75 | 13.75 | 13.75 | 13.75 |
|  |  |  | 2-pyrrolidone | 1.00 | 1.00 | 1.00 | 1.00 | 1.00 | 1.00 | 1.00 | 1.00 |
|  |  | Resin | Resin emulsion |  |  |  |  |  |  |  |  |
|  |  | Pigment (self-dispersible) | c PB15:4 | 5.00 |  |  |  | 5.00 |  |  |  |
|  |  |  | m DQ122 |  | 5.00 |  |  |  | 5.00 |  |  |
|  |  |  | y MA74 |  |  | 5.00 |  |  |  | 5.00 |  |
|  |  |  | k Acid CB |  |  |  | 5.00 |  |  |  | 5.00 |
| Emulsifier |  |  | DO-S EO-SML | 2.00 | 2.00 | 2.00 | 2.00 | 2.00 | 2.00 | 2.00 | 2.00 |
| Nonaqueous discontinuous phase | Water-insoluble organic material having no hydroxyl group |  | n-PO NO |  |  |  |  |  |  |  |  |
|  | Water-insoluble organic material having a hydroxyl group |  | STO | 16.00 | 16.00 | 16.00 | 16.00 |  |  |  |  |
|  |  |  | HGPR |  |  |  |  | 16.00 | 16.00 | 16.00 | 16.00 |
| Total (Ink % by mass) |  |  |  | 100.00 | 100.00 | 100.00 | 100.00 | 100.00 | 100.00 | 100.00 | 100.00 |
| Continuous ejection stability |  |  |  | 4 | 4 | 4 | 4 | 4 | 4 | 4 | 4 |
| Curl amount |  |  |  | 4 | 4 | 4 | 4 | 5 | 5 | 5 | 5 |

The formulations of the inks and the evaluation results of the continuous ejection stability and of the curl amounts concerning Examples 3 and 4 are shown in Table 4 below.

TABLE 4

|  |  |  |  | Example 3 (discontinuous phase: 1%, HGPR discontinuous phase) | | | | Example 4 (discontinuous phase: 74%, HGPR discontinuous phase) | | | |
| --- | --- | --- | --- | --- | --- | --- | --- | --- | --- | --- | --- |
|  |  |  |  | Cyan | Magenta | Yellow | Black | Cyan | Magenta | Yellow | Black |
| Formulation | Aqueous continuous | Water | Ion-exchange water | 59.17 | 59.17 | 59.17 | 59.17 | 7.66 | 7.66 | 7.66 | 7.66 |

TABLE 4-continued

|  |  |  |  | Example 3 (discontinuous phase: 1%, HGPR discontinuous phase) | | | | Example 4 (discontinuous phase: 74%, HGPR discontinuous phase) | | | |
| --- | --- | --- | --- | --- | --- | --- | --- | --- | --- | --- | --- |
|  |  |  |  | Cyan | Magenta | Yellow | Black | Cyan | Magenta | Yellow | Black |
|  | phase | Water-soluble organic solvent | Glycerin | 16.76 | 16.76 | 16.76 | 16.76 | 2.17 | 2.17 | 2.17 | 2.17 |
|  |  |  | 1,3-BD | 16.77 | 16.77 | 16.77 | 16.77 | 2.17 | 2.17 | 2.17 | 2.17 |
|  |  |  | 2-pyrrolidone | 1.00 | 1.00 | 1.00 | 1.00 | 1.00 | 1.00 | 1.00 | 1.00 |
|  |  | Resin | Resin emulsion |  |  |  |  |  |  |  |  |
|  |  | Pigment (self-dispersible) | c PB15:4 | 5.00 |  |  |  | 5.00 |  |  |  |
|  |  |  | m DQ122 |  | 5.00 |  |  |  | 5.00 |  |  |
|  |  |  | y MA74 |  |  | 5.00 |  |  |  | 5.00 |  |
|  |  |  | k Acid CB |  |  |  | 5.00 |  |  |  | 5.00 |
|  | Emulsifier |  | DO-S | 0.30 | 0.30 | 0.30 | 0.30 | 8.00 | 8.00 | 8.00 | 8.00 |
|  |  |  | EO-SML |  |  |  |  |  |  |  |  |
|  | Nonaqueous discontinuous phase | Water-insoluble organic material having no hydroxyl group | n-PO |  |  |  |  |  |  |  |  |
|  |  |  | NO |  |  |  |  |  |  |  |  |
|  |  | Water-insoluble organic material having a hydroxyl group | STO |  |  |  |  |  |  |  |  |
|  |  |  | HGPR | 1.00 | 1.00 | 1.00 | 1.00 | 74.00 | 74.00 | 74.00 | 74.00 |
|  | Total (Ink % by mass) |  |  | 100.00 | 100.00 | 100.00 | 100.00 | 100.00 | 100.00 | 100.00 | 100.00 |
|  | Continuous ejection stability |  |  | 5 | 5 | 5 | 5 | 3 | 3 | 3 | 3 |
|  | Curl amount |  |  | 3 | 3 | 3 | 3 | 5 | 5 | 5 | 5 |

The formulations of the inks and the evaluation results of the continuous ejection stability and of the curl amounts concerning Examples 5 and 6 are shown in Table 5 below.

TABLE 5

|  |  |  |  | Example 5 (without water-soluble organic solvent) | | | | Example 6 (emulsifier: EO-SML) | | | |
| --- | --- | --- | --- | --- | --- | --- | --- | --- | --- | --- | --- |
|  |  |  |  | Cyan | Magenta | Yellow | Black | Cyan | Magenta | Yellow | Black |
| Formu-lation | Aqueous continuous phase | Water | Ion-exchange water | 76.00 | 76.00 | 76.00 | 76.00 | 48.51 | 48.51 | 48.51 | 48.51 |
|  |  | Water-soluble organic solvent | Glycerin |  |  |  |  | 13.74 | 13.74 | 13.74 | 13.74 |
|  |  |  | 1,3-BD |  |  |  |  | 13.75 | 13.75 | 13.75 | 13.75 |
|  |  |  | 2-pyrrolidone |  |  |  |  | 1.00 | 1.00 | 1.00 | 1.00 |
|  |  | Resin | Resin emulsion |  |  |  |  |  |  |  |  |
|  |  | Pigment (self-dispersible) | c PB15:4 | 5.00 |  |  |  | 5.00 |  |  |  |
|  |  |  | m DQ122 |  | 5.00 |  |  |  | 5.00 |  |  |
|  |  |  | y MA74 |  |  | 5.00 |  |  |  | 5.00 |  |
|  |  |  | k Acid CB |  |  |  | 5.00 |  |  |  | 5.00 |
|  | Emulsifier |  | DO-S | 3.00 | 3.00 | 3.00 | 3.00 |  |  |  |  |
|  |  |  | EO-SML |  |  |  |  | 2.00 | 2.00 | 2.00 | 2.00 |
|  | Nonaqueous discontinuous phase | Water-insoluble organic material having no hydroxyl group | n-PO |  |  |  |  |  |  |  |  |
|  |  |  | NO |  |  |  |  |  |  |  |  |
|  |  | Water-insoluble organic material having a hydroxyl group | STO |  |  |  |  |  |  |  |  |
|  |  |  | HGPR | 16.00 | 16.00 | 16.00 | 16.00 | 16.00 | 16.00 | 16.00 | 16.00 |
|  | Total (Ink % by mass) |  |  | 100.00 | 100.00 | 100.00 | 100.00 | 100.00 | 100.00 | 100.00 | 100.00 |
|  | Continuous ejection stability |  |  | 3 | 3 | 3 | 3 | 4 | 4 | 4 | 4 |
|  | Curl amount |  |  | 3 | 3 | 3 | 3 | 5 | 5 | 5 | 5 |

The formulation of the ink and the evaluation results of the continuous ejection stability and of the curl amount concerning Example 7 are shown in Table 6 below.

TABLE 6

|  |  |  |  | Example 7 (discontinuous phase: 80%, HGPR discontinuous phase) | | | |
|---|---|---|---|---|---|---|---|
|  |  |  |  | Cyan | Magenta | Yellow | Black |
| Formulation | Aqueous continuous phase | Water | Ion-exchange water | 3.83 | 3.83 | 3.83 | 3.83 |
|  |  | Water-soluble organic solvent | Glycerin | 1.08 | 1.08 | 1.08 | 1.08 |
|  |  |  | 1,3-BD | 1.09 | 1.09 | 1.09 | 1.09 |
|  |  |  | 2-pyrrolidone | 1.00 | 1.00 | 1.00 | 1.00 |
|  |  | Resin | Resin emulsion |  |  |  |  |
|  |  | Pigment (self-dispersible) | c PB15:4 | 5.00 |  |  |  |
|  |  |  | m DQ122 |  | 5.00 |  |  |
|  |  |  | y MA74 |  |  | 5.00 |  |
|  |  |  | k Acid CB |  |  |  | 5.00 |
|  | Emulsifier |  | DO-S | 8.00 | 8.00 | 8.00 | 8.00 |
|  |  |  | EO-SML |  |  |  |  |
|  | Nonaqueous discontinuous phase | Water-insoluble organic material having no hydroxyl group | n-PO |  |  |  |  |
|  |  |  | NO |  |  |  |  |
|  |  | Water-insoluble organic material having a hydroxyl group | STO |  |  |  |  |
|  |  |  | HGPR | 80.00 | 80.00 | 80.00 | 80.00 |
|  | Total (Ink % by mass) |  |  | 100.00 | 100.00 | 100.00 | 100.00 |
|  | Continuous ejection stability |  |  | 2 | 2 | 2 | 2 |
|  | Curl amount |  |  | 5 | 5 | 5 | 5 |

The constitutions of the inks of Examples 1 to 7 and Comparative Examples 1 to 4 described above are shown in Table 7.

TABLE 7

|  |  | Amount of discontinuous phase | Type of discontinuous phase | Addition of resin | Water-soluble organic solvent | Type of emulsifier |
|---|---|---|---|---|---|---|
| Table 1 | Comparative Example 1 | 0.0 | — | Not added | Present | — |
|  | Comparative Example 2 | 0.0 | — | Added | Present | — |
| Table 2 | Comparative Example 3 | 16.0 | n-PO | Not added | Present | DO-S |
|  | Comparative Example 4 | 16.0 | NO | Not added | Present | DO-S |
| Table 3 | Example 1 | 16.0 | STO | Not added | Present | DO-S |
|  | Example 2 | 16.0 | HGPR | Not added | Present | DO-S |
| Table 4 | Example 3 | 1.0 | HGPR | Not added | Present | DO-S |
|  | Example 4 | 74.0 | HGPR | Not added | Present | DO-S |
| Table 5 | Example 5 | 16.0 | HGPR | Not added | Not present | DO-S |
|  | Example 6 | 16.0 | HGPR | Not added | Present | EO-SML |
| Table 6 | Example 7 | 80.0 | HGPR | Not added | Present | DO-S |

As shown by the results in Tables 1 to 6, favorable continuous ejection stability and a reduction in the curl amount of recording paper were able to be realized in practice by any of the inks of Examples 1 to 7, which were ink-jet O/W emulsion inks each including the aqueous continuous phase (a) that contained water, at least one pigment and at least one ionic or nonionic surfactant, and the nonaqueous discontinuous phase (b) that contained at least one water-insoluble organic material having a hydroxyl group.

As to the ink of Example 7 including the nonaqueous discontinuous phase (b) by more than 74% by mass, however, a slight degradation of continuous ejection stability was confirmed as compared with the ink of Example 4.

The curl amount of recording paper was unable to be reduced by the ink of Comparative Example 1, which was an aqueous ink including neither a nonaqueous discontinuous phase nor an emulsion resin.

Meanwhile, favorable continuous ejection stability was unable to be secured in practice by the ink of Comparative Example 2 including an emulsion resin but not including a nonaqueous discontinuous phase.

As for the inks of Comparative Examples 3 and 4 in which the water-insoluble organic materials in the nonaqueous discontinuous phases did not have hydroxyl groups, a satisfactory property was unable to be obtained in practice in terms of either continuous ejection stability or a reduction in the curl amount of recording paper.

What is claimed is:

1. An ink-jet O/W emulsion ink comprising:
   an aqueous continuous phase (a), and
   a nonaqueous discontinuous phase (b),
   wherein the aqueous continuous phase (a) comprises water, at least one pigment and at least one ionic or nonionic surfactant, and the nonaqueous discontinuous phase (b) comprises at least one water-insoluble organic material having a hydroxyl group.

2. The ink-jet O/W emulsion ink according to claim 1, wherein the nonaqueous discontinuous phase (b) occupies 1% by mass to 74% by mass of the ink-jet O/W emulsion ink.

3. The ink-jet O/W emulsion ink according to claim 1, wherein the at least one water-insoluble organic material having a hydroxyl group, contained in the nonaqueous discontinuous phase (b), is a hydroxy fatty acid ester of a polyhydric alcohol.

4. The ink-jet O/W emulsion ink according to claim 1, wherein the aqueous continuous phase (a) contains a nonvolatile water-soluble organic solvent.

5. An ink-jet recording method comprising:
   performing recording by ejecting an ink from an ink-jet head fixed in the form of a line,
   wherein the ink is an ink-jet O/W emulsion ink which comprises an aqueous continuous phase (a), and a nonaqueous discontinuous phase (b), and
   wherein the aqueous continuous phase (a) comprises water, at least one pigment and at least one ionic or nonionic surfactant, and the nonaqueous discontinuous phase (b) comprises at least one water-insoluble organic material having a hydroxyl group.

6. The ink-jet O/W emulsion ink according to claim 1, wherein the pigment is a self-dispersible pigment.

7. The ink-jet O/W emulsion ink according to claim 1, wherein the surfactant is present in an amount of from 0.01% by mass to 10% by mass.

8. The ink-jet O/W emulsion ink according to claim 1, wherein the surfactant is at least one anionic surfactant selected from the group consisting of a higher fatty acid salt, a higher alkyldicarboxylic acid salt, a higher alcohol sulfuric acid ester salt, a higher alkylsulfonic acid salt, a alkylbenzenesulfonic acid salt, a alkylnaphthalenesulfonic acid salt, a formalin polycondensate of a salt of naphthalenesulfonic acid, a condensates of a higher fatty acid and amino acid, a dialkylsulfosuccinic acid ester salt, an alkylsulfosuccinic acid salt, a naphthenic acid salt, an alkyl ether carboxylate, an acylated peptide, an α-olefin sulfonate, an N-acylmethyltaurine, an alkyl ether sulfate, a secondary higher alcohol ethoxy sulfate, a polyoxyethylene alkylphenyl ether sulfate, a monoglysulfate, an alkyl ether phosphoric acid ester salt and a alkyl phosphoric acid ester salt.

9. The ink-jet O/W emulsion ink according to claim 1, wherein the surfactant is at least one cationic surfactant selected from the group consisting of an aliphatic amine salt, a quaternary ammonium salt, a sulfonium salt and a phosphonium salt.

10. The ink-jet O/W emulsion ink according to claim 1, wherein the surfactant is at least one nonionic surfactant selected from the group consisting of a fluorine-based surfactant, a silicone-based surfactant, an acrylic acid copolymer material, a polyoxyethylene alkyl ether, a polyoxyethylene alkylphenyl ether, a polyoxyethylene secondary alcohol ether, a polyoxyethylene sterol ether, a polyoxyethylene lanolin derivative, an ethylene oxide derivative of an alkylphenol formalin condensate, a polyoxyethylene-polyoxypropylene block polymer, a fatty acid ester of a polyoxyethylene polyoxypropylene alkyl ether polyoxyethylene compound, a polyethylene oxide condensed polyethylene glycol fatty acid ester, a fatty acid monoglyceride, a polyglycerin fatty acid ester, a sorbitan fatty acid ester, a propylene glycol fatty acid ester, a sucrose fatty acid ester, a fatty acid alkanol amide, a polyoxyethylene fatty acid amide and a polyoxyethylene alkylamine alkylamine oxide.

11. The ink-jet O/W emulsion ink according to claim 1, wherein the surfactant is at least one selected from the group consisting of sodium dioctyl sulfosuccinate and polyoxyethylene sorbitan monolaurate.

12. The ink-jet O/W emulsion ink according to claim 1, wherein the water-insoluble organic material having a hydroxyl group is selected from the group consisting of a sorbitan fatty acid ester, a polyoxyethylene sorbitan fatty acid ester, a (poly)glycerin fatty acid ester, a polyoxyethylene glycerin fatty acid ester, a polyethylene glycol fatty acid ester, a polyoxyethylene alkyl ether, a polyoxyethylene alkylphenyl ether, a polyoxyethylene alkylamine-fatty acid amide, a polyoxyethylene polyoxypropylene alkyl ether, a polyoxyethylene castor oil, a polyoxyethylene hardened castor oil and a higher alcohol.

13. The ink-jet O/W emulsion ink according to claim 1, wherein the water-insoluble organic material having a hydroxyl group is hexaglycerin polyricinolate.

14. The ink-jet O/W emulsion ink according to claim 7, wherein the surfactant is present in an amount of from 0.1% by mass to 8% by mass.

* * * * *